United States Patent
Soemo et al.

(10) Patent No.: US 8,121,994 B2
(45) Date of Patent: Feb. 21, 2012

(54) PARTIALLY EMBEDDED DATABASE AND AN EMBEDDED DATABASE MANAGER FOR A CONTROL SYSTEM

(75) Inventors: Michael Soemo, Lombard, IL (US); Mark Gagner, West Chicago, IL (US); John Stewart, Hoffman Estates, IL (US); Phil Pollock, McHenry, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 571 days.

(21) Appl. No.: 11/145,203

(22) Filed: Jun. 3, 2005

(65) Prior Publication Data

US 2005/0228771 A1      Oct. 13, 2005

Related U.S. Application Data

(62) Division of application No. 10/054,751, filed on Oct. 22, 2001, now Pat. No. 7,072,879.

(51) Int. Cl.
*G06F 7/00*   (2006.01)

(52) U.S. Cl. ......... 707/705; 707/769; 707/802; 711/155

(58) Field of Classification Search .................. None
See application file for complete search history.

(56) References Cited

U.S. PATENT DOCUMENTS

| | | | | |
|---|---|---|---|---|
| 5,860,083 A | * | 1/1999 | Sukegawa | 711/103 |
| 5,963,960 A | * | 10/1999 | Swart et al. | 707/202 |
| 6,028,599 A | * | 2/2000 | Yuen et al. | 725/50 |
| 6,249,844 B1 | * | 6/2001 | Schloss et al. | 711/122 |
| 6,321,235 B1 | * | 11/2001 | Bird | 707/203 |
| 6,523,036 B1 | * | 2/2003 | Hickman et al. | 707/10 |
| 6,598,114 B2 | * | 7/2003 | Funakoshi | 711/103 |
| 6,598,137 B1 | * | 7/2003 | Yaegawa et al. | 711/165 |
| 7,072,879 B2 | * | 7/2006 | Soemo et al. | 707/1 |

* cited by examiner

*Primary Examiner* — Tim T Vo
*Assistant Examiner* — Hasanul Mobin

(57) ABSTRACT

A method is used for editing a data element stored in a static memory device comprising a plurality of storage units. The method includes a step of copying a content of one of the storage units to a dynamic memory device, wherein the content comprises the data element. The method further includes editing the data element while the data element is stored in the dynamic memory. The method also includes erasing said one of the storage units, and writing the content, including the data element that has been edited, into one of the storage units.

14 Claims, 9 Drawing Sheets

PARTIALLY EMBEDDED DATABASE AND AN EMBEDDED DATABASE MANAGER FOR A CONTROL SYSTEM

This application is a divisional of, and claims the benefit of, prior application Ser. No. 10/054,751, filed Oct. 22, 2001.

FIELD OF THE INVENTION

The present invention generally relates to a data storage system for a control system, and more particularly to a database that is partitioned between static and dynamic memory and a database manager that is stored in static memory.

BACKGROUND OF THE INVENTION

Control systems are becoming increasingly more computerized. As a result, many of today's controllers include processors for processing control system data. However, processing power is only useful if adequate memory is available to support the processor when performing tasks.

Unfortunately, economic considerations often dictate the amount of memory installed in a controller, and, as a result, insufficient memory problems may arise. Such insufficient memory problems often arise, for example, when an existing control system is upgraded or refurbished instead of replaced. Specifically, the process of upgrading the control system typically involves adding features by downloading additional software into the system's controllers. However, the memory required to operate the additional software often exceeds the capacity of the existing memory disposed in the controller. Unfortunately, modifying memory or any other hardware associated with an existing controller may be too costly to implement. This problem is further exacerbated when, for example, the control system is a building control system that has been integrated into the design of the building in which the system is installed. In these cases, a control system upgrade may require modifying the building design, a result that is both costly and typically undesired.

In addition, the control system design process often involves designing the hardware and software separately. However, the hardware for a controller is often completed before the software required to operate the controller. As a result, the amount of memory required for the design is usually estimated in advance. However, the amount of memory required to support the final version of the software often exceeds the memory estimations due to the number of advanced features being supplied by today's controllers. Moreover, designing the hardware at the same time as the software will not necessarily eliminate the problem because, even after system installation, the software associated with a controller often continues to evolve to meet customer demands for additional features. As a result, control system designers are frequently forced to eliminate features or otherwise reduce the memory requirements of the software that supplies the features.

Thus, there is a need in the art for a device that overcomes one or more of the foregoing problems.

SUMMARY OF THE INVENTION

The present invention is directed to a partially embedded database configured as a set of files stored in a static memory device and in a dynamic memory device. A catalog defines the structure of the database and identifies the data elements that are stored in the static memory and the data elements that are stored in the dynamic memory. An embedded database manager uses the catalog to create and maintain the database and further uses a file system to access the database files.

A method for modifying the static data includes the steps of copying the static data into a cache implemented using random access memory, modifying the data stored in the cache and then writing the modified data into the static memory. A method for compressing the database to conserve memory involves collectively storing Boolean data elements.

DETAILED DESCRIPTION

Figure 1:
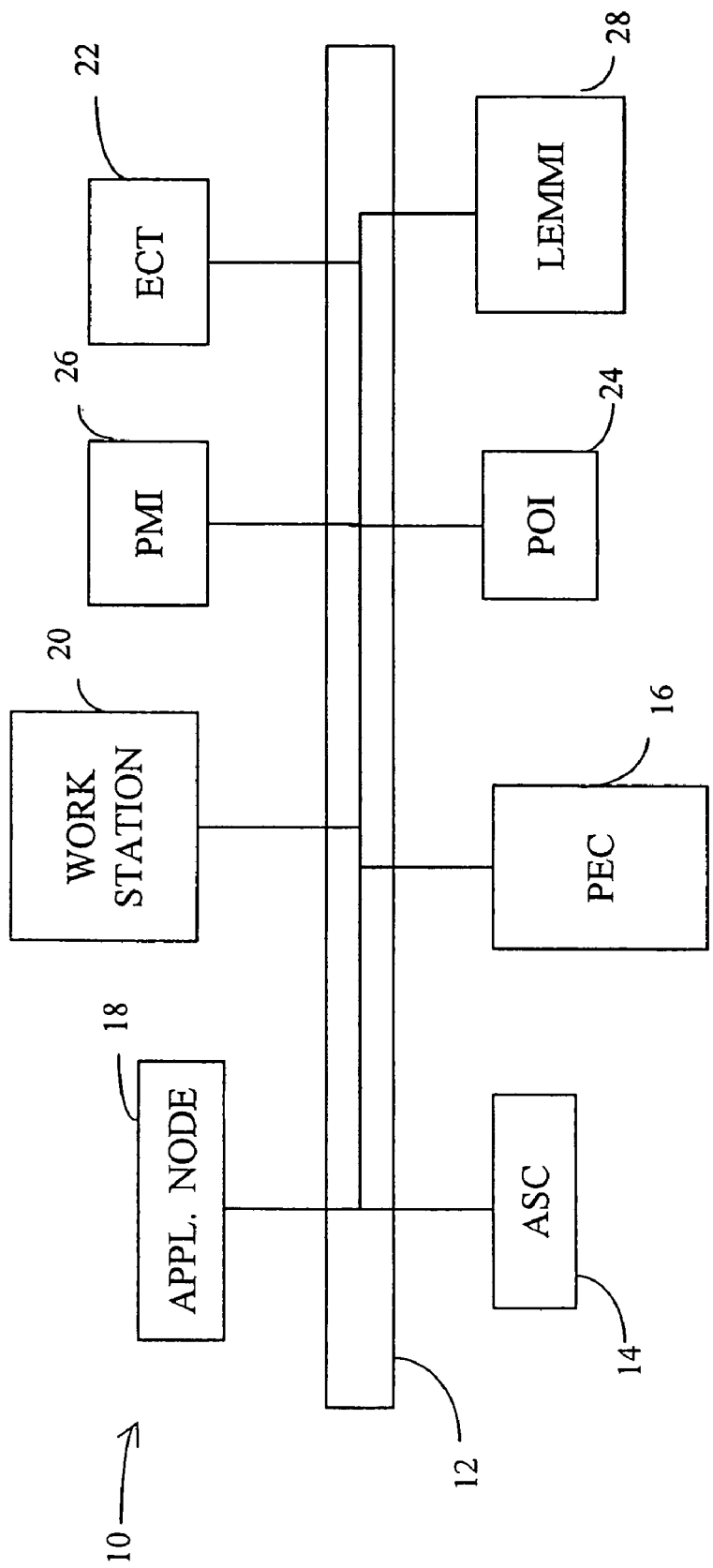
FIG. 1 is a control system having a set of network devices, including an application node, coupled to a communication network according to one aspect of the invention.

Referring now to the drawings wherein like reference numerals refer to similar or identical parts throughout the several views, and more specifically to FIG. 1 thereof, a control network 10 for providing, for example, building control includes a communication network 12 to support communication between a set of network control devices including an application specific controller 14, a programmable equipment controller 16, an application node 18, an operator workstation 20, and an engineering and commissioning tool 22. The network control devices may further include a set of interfaces by which an operator may monitor/control the system including a portable operator interface 24, a panel mount interface 26, and a low end human machine interface 28 having a small display and limited features.

The application specific controller 14 is configured to control a local mechanical and/or electronic device (not shown) associated with a specific application such as, for example, valve or damper actuation. In contrast, the programmable equipment controller 16 is configurable to control a local mechanical and/or electronic device (not shown) associated with any desired type of application. The application node 18 provides services to the other network devices such as scheduling, data logging, paging, printing, alarm management and routing and protocol conversion. The operator workstation 20 automatically uploads and downloads network image data and system data and includes a user interface by which users may access control system information. The workstation 20 may be adapted to provide graphics, exception reporting, diagnostics, report generation, display, printing and dial out.

System engineering and commissioning is performed via the engineering and commissioning tool 22 which may also be used to graphically program the programmable equipment controller 16. In addition, the engineering and commissioning tool 22 may be used to compile data, download configuration data, perform diagnostics, generate and display reports and upload/download system data.

Figure 2:
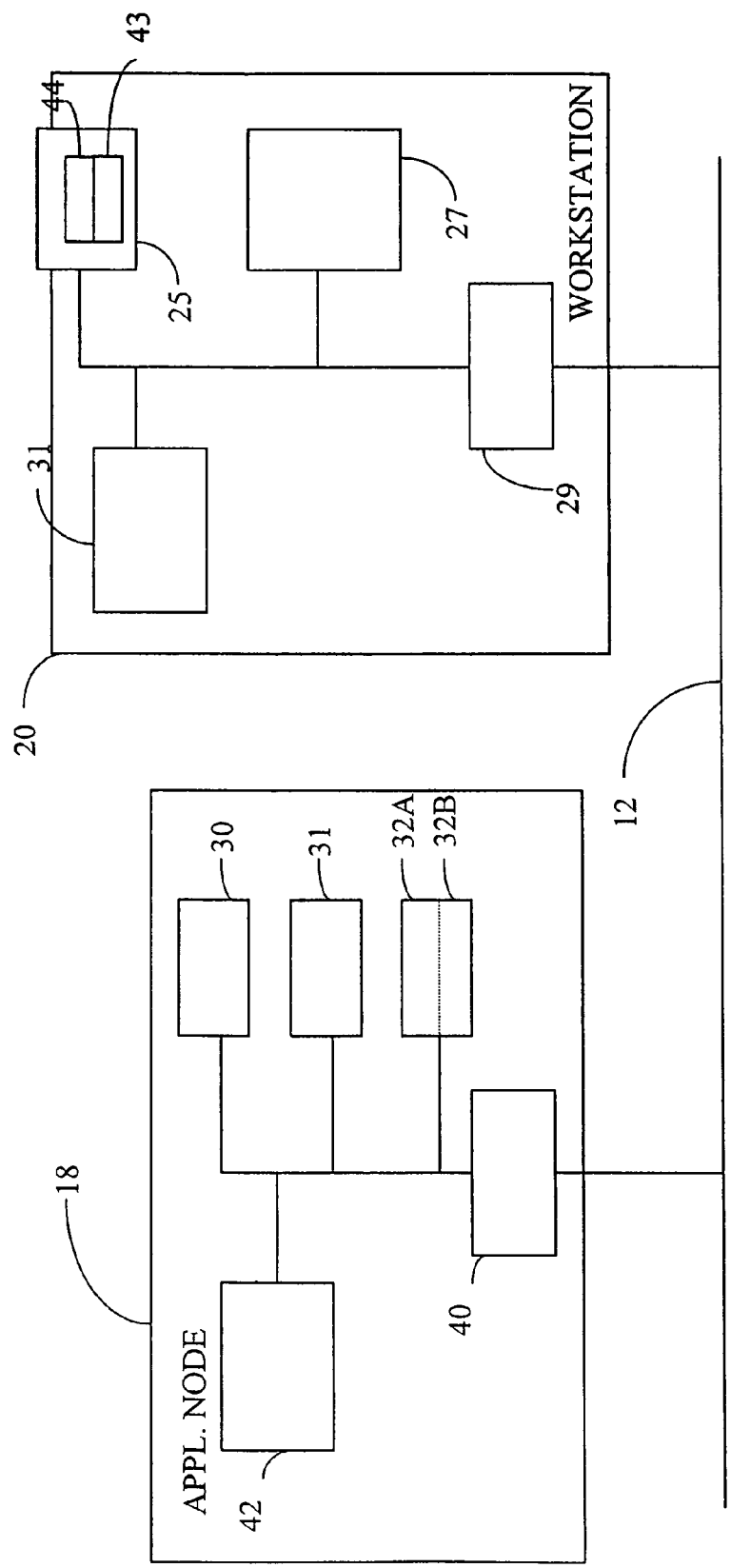
FIG. 2 is a block diagram of the application node of FIG. 1, having a database and a database manager, and a workstation that is also coupled to the communication network of FIG. 1 according to another aspect of the invention.
Figure 3:
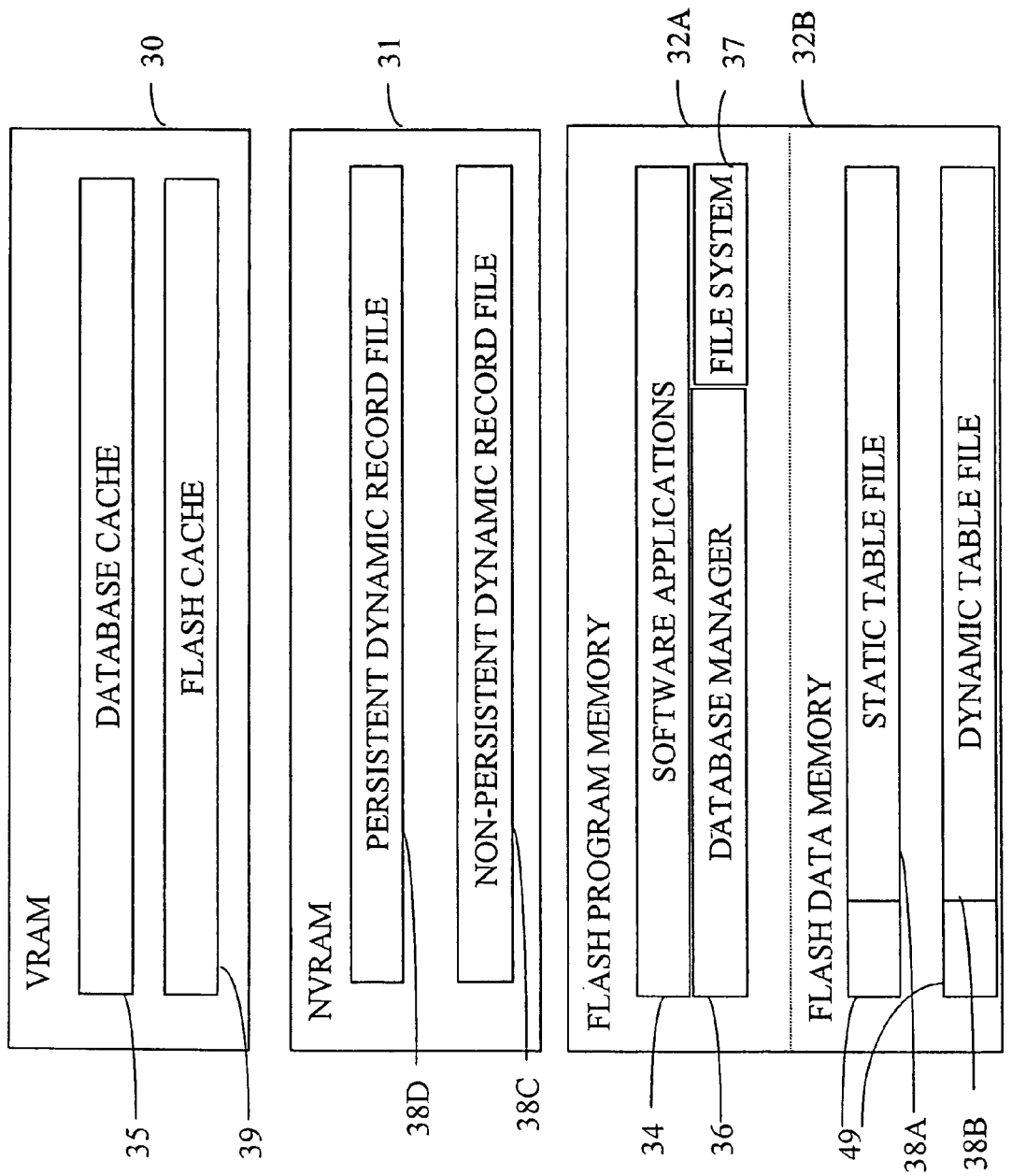
FIG. 3 is a block diagram of a static memory device and two dynamic memory devices disposed in the application node of FIGS. 1 and 2.

Referring now to FIGS. 2 and 3, the application node 18 includes a volatile random access memory (VRAM) device 30, a non-volatile random access memory device (NVRAM) device 31 and a static memory 32A and 32B. The VRAM 30 is erased during each power cycle but will retain stored values during a reset operation and may be implemented using, for example, a Toshiba TC554001 memory device. In contrast, the NVRAM 31 retains stored values via power supplied via a battery (not shown) or similar auxiliary power supply even when the application node 18 loses its main power supply (not shown). As a result, the values stored in the NVRAM 31 are retained until actively erased. The application node 18 also includes a static memory device 32, implemented using, for example, a flash memory device, that retains stored values in a semi-permanent fashion. The static memory device 32 is partitioned into a flash program memory 32A reserved for software applications 34, including a database manager program 36, and a flash data memory 32B reserved for static, i.e., non-changing, data. In addition, the application node 18 includes a neuron network processor 40 to enable communication on the network 12 and further includes a microprocessor 42, such as a Motorola 68302 microprocessor, for executing the applications 34 stored in the application node 18.

Like the application node 18, the workstation 20 also includes a random access memory (RAM) device 25, a hard disk memory device 27, a neuron network processor 29 and a microprocessor 31. In addition, the workstation 20 includes a database generation tool 43 for generating a database 38 and a database interface program 44 that may be used by an operator to access the database 38 disposed in the application node 18 via the network 12.

Referring still to FIG. 3, the database 38 is configured as a set of files 38A, 38B, 38C and 38D. Dynamic record files 38C and, 38D are each stored on a memory device 31, with the two files occupying a contiguous area of the memory device 31. Each database table 38A and 38B includes a header of data referred to as a catalog 49 that defines the structure of the database file 38A and 38B and the type of data to be stored in each file 38A, 38B, 38C, and 38D. Specifically, static table data and the dynamic table catalog, which includes data elements that are never or rarely expected to change, are stored in the static data files 38A and 38B located in the flash data memory 32B. Dynamic record data, which includes data elements that are expected to change frequently, are stored in two different types of files 38C and 38D on NVRAM 31 depending on whether the data is categorized as persistent dynamic data or non-persistent dynamic data. The persistent dynamic data comprises the data elements that, although expected to change eventually, are also expected to remain in memory when power is removed from the application node 18. As a result, the persistent dynamic data are stored in the persistent dynamic data file 38D in the NVRAM 31. In contrast, the non-persistent dynamic data are not expected to remain in memory when the power has been removed from the application node 18 and, therefore, the non-persistent dynamic data are stored in a non-persistent dynamic data file 38C in the NVRAM 31. By way of example, the persistent dynamic data may comprise data such as accumulated totalization values for a process control device that must persist across a loss of power, and the non-persistent dynamic data may comprise data such as the current alarm state information for a process control device or the position of a valve or actuator.

Figure 4:
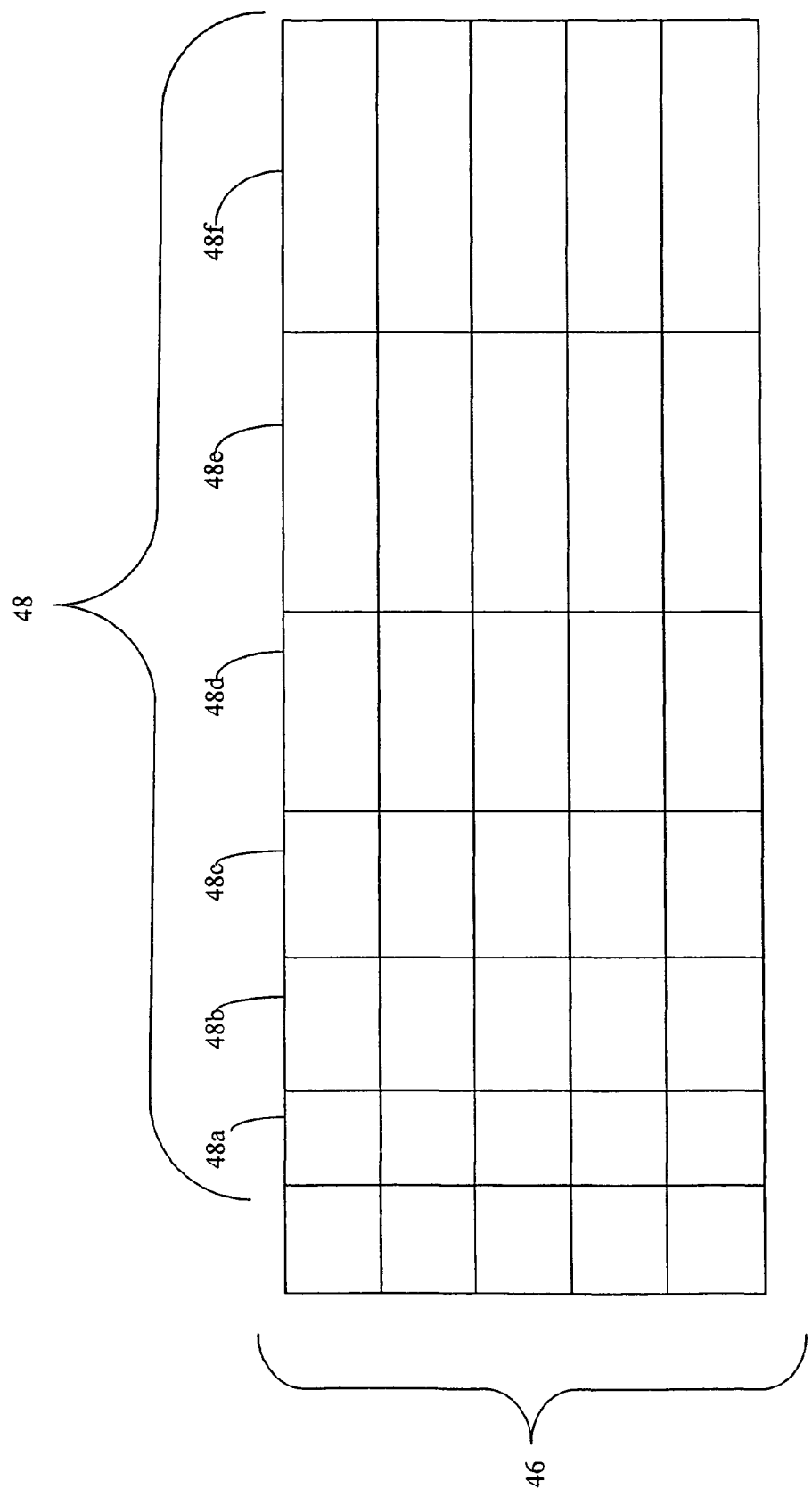
FIG. 4 is an illustration of the data records and data fields contained in the database of FIG. 2.

Referring now to FIGS. 2, 3 and 4, the database files 38A, 38B, 38C, and 38D contain process control information about the control system 10. For example, the database files 38A, 38B, 38C, and 38D combined identify all of the process control devices coupled to the network 12 and provide information regarding the operation of each device. More specifically, the database files 38A, 38B, 38C, and 38D comprise a set of data records 46, each comprising a set of data fields 48. The catalog 49 indicates the number of data fields 48 in the database files 38A, 38B, 38C, 38D and the order in which the data fields 48 are stored in each of the database files 38A, 38B, 38C, 38D. For example, a first data field 48a may be designated to store an identification number of a network device and a set of data fields 48b-48f following the first data field 48a may contain additional data related to the network device. The catalog 49 also indicates the characteristics of the data to be stored in each of the data fields 48. For example, the data fields 48 may be designated to contain character strings, integers, and/or numbers in a floating-point notation or Boolean elements. As will be appreciated by one having ordinary skill in the art, catalogs are conventionally used to define a database structure and may be created in any number of formats and may contain any desired information necessary to define the structure of the associated database.

The database manager 36 is a software program stored in a computer readable medium provided by flash program memory 32A of the application node 18 that may be used to access data contained in the database 38. In particular, the database manager 36, operating in response to commands from the database interface program 44, allows a user to retrieve the data contained in the database 38, to sort the data, modify the data and add or delete the data. Likewise, the application programs 34 stored in the application node 18 use the database manager 36 to access and utilize the database 38. The database manager 36 may be configured to enable any number of advanced sorting and report generating features.

The database manager 36 accesses the database files 38A, 38B, and 38C using a file system 37 that is implemented via software and that is stored in the flash program memory 32B of the application node 18. Information contained in database table files 38A and 38B direct the database manager to create cache areas 35 in VRAM and record files 38C and 38D in NVRAM. The file system 37 allows the database manager 36 to open and access each of the database files 38A, 38B, 38C, 38D and further allows the database manager 36 to directly access the memory contents of each database record file 38A, 38B, 38C, 38D as structured memory. More particularly, because the database record files 38C and 38D are stored as a set of contiguous files, the data stored in each file 38C and 38D remain unfragmented and arranged in a set order. As a result, the data can be accessed using any of a number of rapid addressing methods that generally involve using a memory pointer.

As will be appreciated by one having ordinary skill in the art, file systems are software tools that are conventionally used to open and manipulate computer files. However, file systems are typically designed to access a file by performing a series of steps, such as, for example, opening the file, seeking a position within a file, reading a segment of data from the file. Thus a series of steps are required before the desired data is actually obtained, causing these file access methods to be slow compared to methods that use direct memory pointers. Accordingly, the file system 37 provides access to the database file 38 using direct memory pointers to achieve timesavings.

In order to take advantage of this specialized functionality, database record files 38C and 38D are created as contiguous files. Normal files hold their data as a linked list of many smaller blocks of data. Contiguous files, on the other hand, hold their data as a single large block of data in memory. The file system 37 provides a novel interface that returns the address of the single contiguous data block containing files 38C and 38D to the database manager 36. The database manager 36 is then free to access the contiguous data block as a structured memory without using the file system 37 as an intermediary. This novel functionality allows the present invention to accomplish significant timesavings over many methods of the prior art.

Because the database is configured as a set of files, any application stored on any other network device such as, for example, the workstation node 20, may directly communicate with the file system 37 and thereby access any of the database files 38A, 38B, 38C, and 38D. Since the files are preferably openly accessible using the standard file transfer protocol (FTP) additional communication strategies and communication protocols need not be developed to enable communication between an application on another network device and the file system operating in the application node. In addition, remote file system access features supported by the FTP protocol provide remote access to the database on a record-by-record or field-by-field basis across the network 12.

Further, because the database is configured as a set of files, the file system 37 may be used to maintain and access the files on the different media. As a result, the database manager 36 need not be specially configured to maintain and access the database files 38A, 38B, 38C, and 38D located on the separate media. Specifically, as will be understood by one having ordinary skill in the art, file systems are conventionally configured to access files that are stored on different media. For example, when configuring a processor and installing a file system, an operator is typically prompted to define one or more accessible memory drives and to provide a description of the characteristics of each drive including, for example, whether the drive is volatile, non-volatile or flash memory. Then, when accessing a file, the file system uses the pathname of the file to determine which of the memory drives to access and may further use the description of the drive to determine how to access the drive.

In addition, a portion of the VRAM 30 is reserved for usage as a database cache 35 to which static data stored in the flash memory 32 may be temporarily copied for modification, should modification be desired. In addition, the database manager 36 maintains a directory that indicates whether any of the static data elements have been copied to the cache 35 so that a user or application 34 trying to access the static data elements has access to the most recent version of the data elements. As will be appreciated by one having ordinary skill in the art, using a temporary storage area constructed to operate as a cache is known in the art and typically involves reserving a segment of random access memory for temporary data storage. Typically the memory space occupied by the cache is large enough so that an entire block of data may be stored in the cache without fragmenting the data in the VRAM 30. As will further be appreciated by one having ordinary skill in the art, alternative data storage techniques may be used in place of a cache. For example, the static data temporarily moved to the cache may be stored and processed as a file so that the data is treated as a block of data to be kept together instead of as separate pieces of data.

Figure 5:
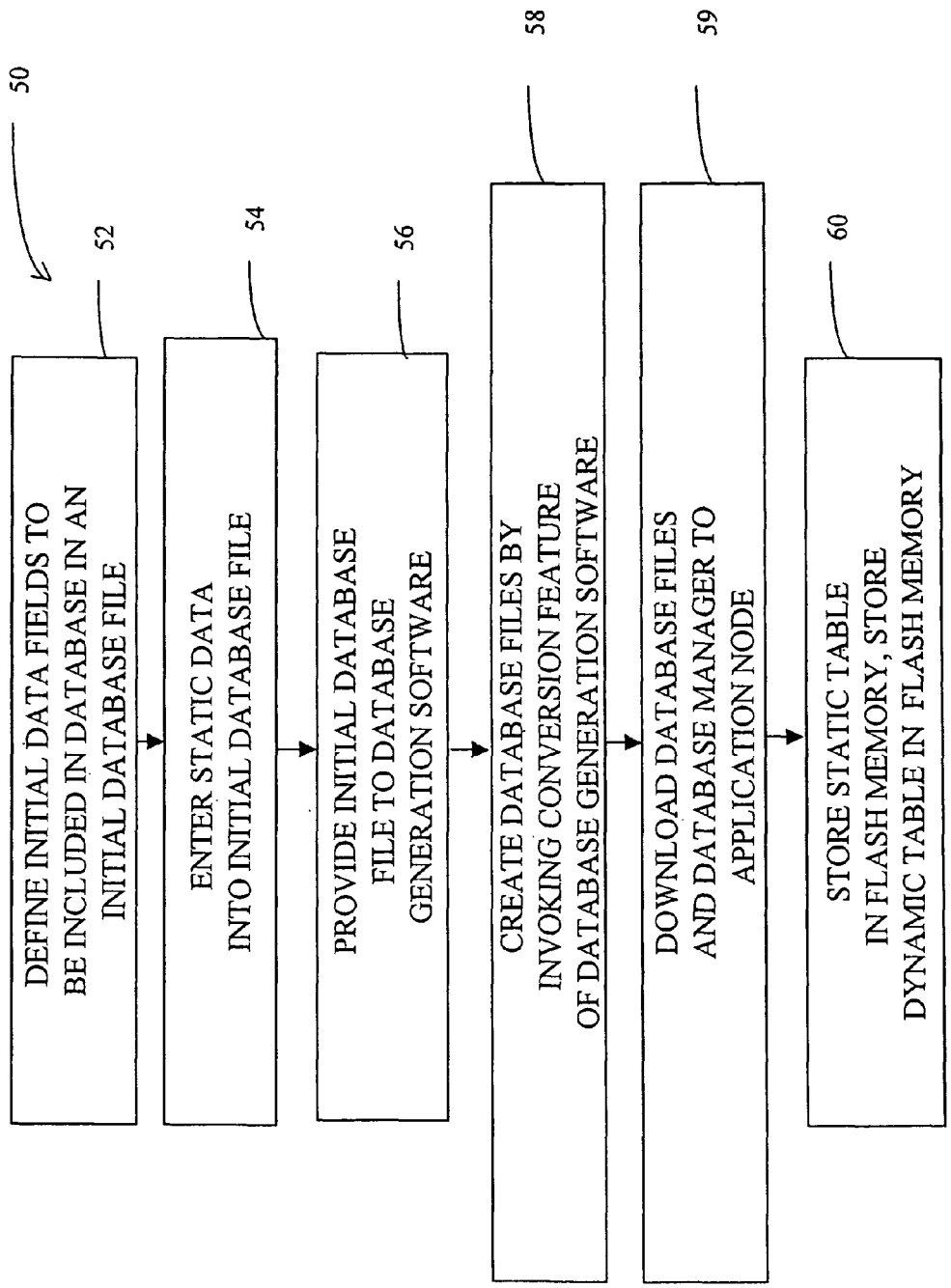
FIG. 5 is a flow chart representing a method for creating and installing the database and database manager of FIG. 2 according to another aspect of the invention.

Referring now to FIGS. 2 and 5, a method 50 for creating the database 38 and installing the database 38 in the application node 18 begins when a system operator determines and defines the static and dynamic data fields to be included in the database 38 by creating an initial database file using the database generation software 43 (step 52). Next, the operator enters the static data into the fields of the initial database file that are designated for static data (step 54). After creating the initial database file that defines the data fields to be included in the database 38 and that includes the entered, static data, the operator supplies the initial database file to the database generation software 43 (step 56) and invokes a conversion feature associated with the database generation software 43 (step 58). Invoking the conversion feature causes the database generation software 43 to create the two database files 38A and 38B, formatted as table files, based on the information supplied by the operator. As described above, the first table file 38A contains the catalog 49 that defines the structure of the static fields of the database 38 and further contains the static data. The second table file 38B contains the catalog 49 that defines the structure of the dynamic data.

As will be appreciated by one having ordinary skill in the art, database generation software applications that enable the creation of databases, such as Microsoft Access, are well known in the art and are thus not described further herein. In addition, dialog software may be implemented on top of the Microsoft Access program to simplify the data entry process. Specifically, the dialog software may cause the processor 42 to present a display containing prompts that inform the user as to the type of data to be entered into each data field.

Figure 6:
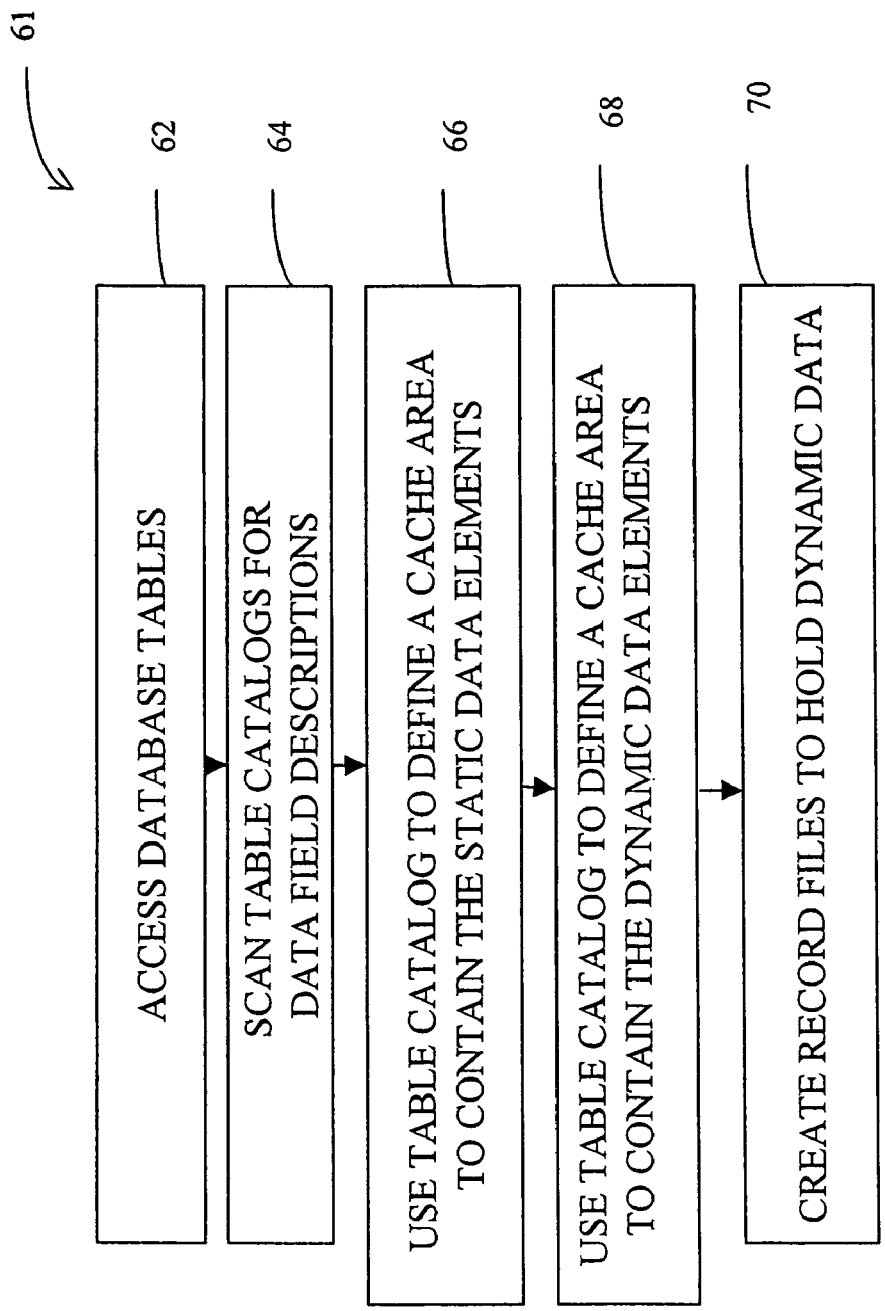
FIG. 6 is a flow chart representing a method for initializing a database from table files to produce a database cache and record files.
Figure 7:
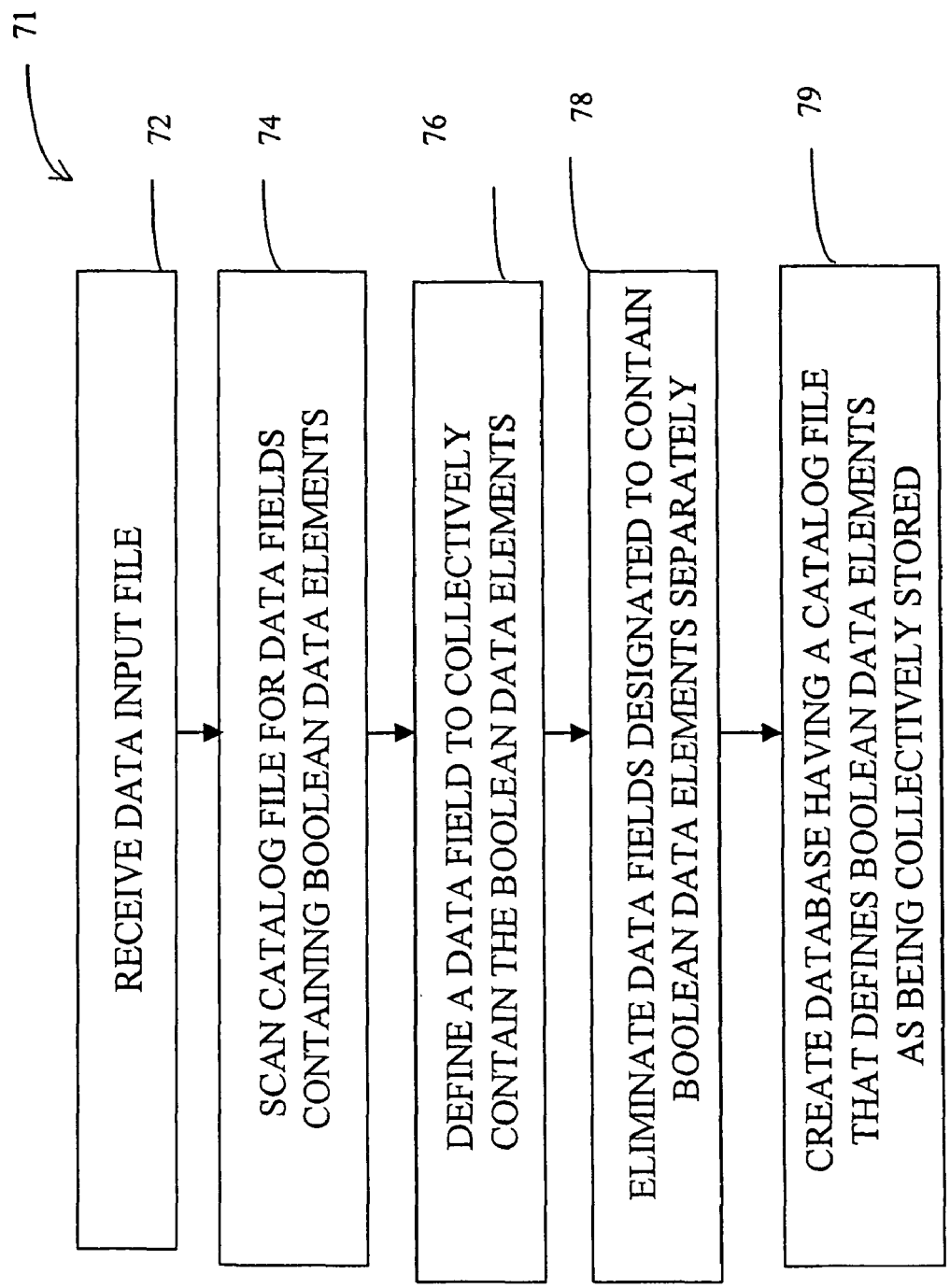
FIG. 7 is a flow chart representing a method for compressing a database according to still another aspect of the invention; and, FIG. 8 is a flow chart representing a method for modifying a set of static data elements stored in the database according to a still further aspect of the invention.

After the table files 38A and 38B have been created, the user causes the table files 38A and 38B to be downloaded via the network 12 to the application node 18 using the well known file transfer protocol (step 59). At the application node 18, the table files 38A and 38B are stored in the flash data memory 32B (step 60). With reference now made to FIG. 6, the application 34 uses the database manager 36 when required to access the table files 38A and 38B (step 62). As a consequence of this access, the database manager scans the table catalogs 49 (step 64) and creates cache entries for static tables (step 66) and dynamic tables (step 68) as well as dynamic record files 38C and 38D in NVRAM 31 (step 70). Other applications are free to access these database structures without additional penalties.

In addition, dynamic data received from any of the applications 34 or the user is stored in either the NVRAM 31 or the VRAM 30 cache, depending on how the data is categorized in the catalog 49 (step 66). Memory space is not reserved in the VRAM 30 and the NVRAM 31 for the dynamic data elements until the database table files 38A and 38B are accessed by the application and is then shared by subsequent applications, thereby ensuring efficient usage of the available VRAM 30 and NVRAM 31. Further, due to the usage of the file system, the partitioned manner in which the data elements are stored is transparent to the user and the application programs 34 such that, when extracting data from the database 38 neither the user nor the application program 34 need know whether the desired data element is stored in flash 32 or RAM 30.

This may be accomplished, for instance, through an application program 34 creating a functional module or object, such as a CAppDatabase object, that manages database access. The application 34 may request the CAppDatabase object to open a table file, which may comprise a pair of files 38A and 38B that have ".tbl" and ".dyn" extensions, respectively, and that contain a static and a dynamic data portion, respectively. In response, the object will provide the table name, which is then cached for access to the associated table files. All static data elements within the ".tbl" file 38A will use the file named <table_name>.tbl for a final file update. Dynamic record data associated with file 38B is stored in a file <table_name.rec> and contains all the fields defined in the "a.dyn" 38B catalog.

Referring now to FIGS. 4 and 6, the database manager 36 generally maintains the database files 38A, 38B, 38C and 38D according to the order in which the data fields 48 are listed in their respective catalogs 49. However, Boolean data elements are treated differently. Specifically, the data fields 48 in the database are typically defined to be at least a byte long. In contrast, only a single bit is required to represent a Boolean element, with the result that a byte-sized space would have eight times the required space. As a result, storing each Boolean element in a separate byte sized data field 48 represents an inefficient usage of memory. To ensure efficient memory usage, a novel method 71 may be performed using the conversion feature of the database generation software application 43 that converts the entered database structure and entered, static data into the set of database files 38A and 38B. Specifically, when the initial database file containing the database structure and the static data is supplied to the database generation software application (step 72) (see also step 58 of FIG. 5), the conversion feature identifies any data fields 48 that are designated to contain Boolean data elements (step 74).

Once these data fields 48 have been identified, a data field for collectively storing the Boolean elements is defined (step 76). In addition, the data fields originally designated to separately store the Boolean elements are eliminated (step 78). Next, the database generation software application 43 generates the database table files 38A and 38B each having a catalog 49 and, depending on the nature of the Boolean data elements, each catalog may define a data field in which the Boolean elements are collectively stored (step 79). Of course, if more than eight Boolean elements are associated with a single data record, then one or more additional bytes are used to store the Boolean elements. In addition, the catalogs 49 reflect the rearranged order of the Boolean elements and the location of each Boolean element is indicated in the catalog file using the name of the data field originally designated to store the Boolean element. Thus, when one of the Boolean elements is accessed by a user operating the workstation 20, the database manager 36 may use the name of the original data field to determine where the Boolean element is stored in the database.

Advantageously, the method 71 thus provides increased memory efficiency by more efficiently using the byte-long data fields 48 that were originally designated to contain a single bit sized Boolean element.

Figure 8:
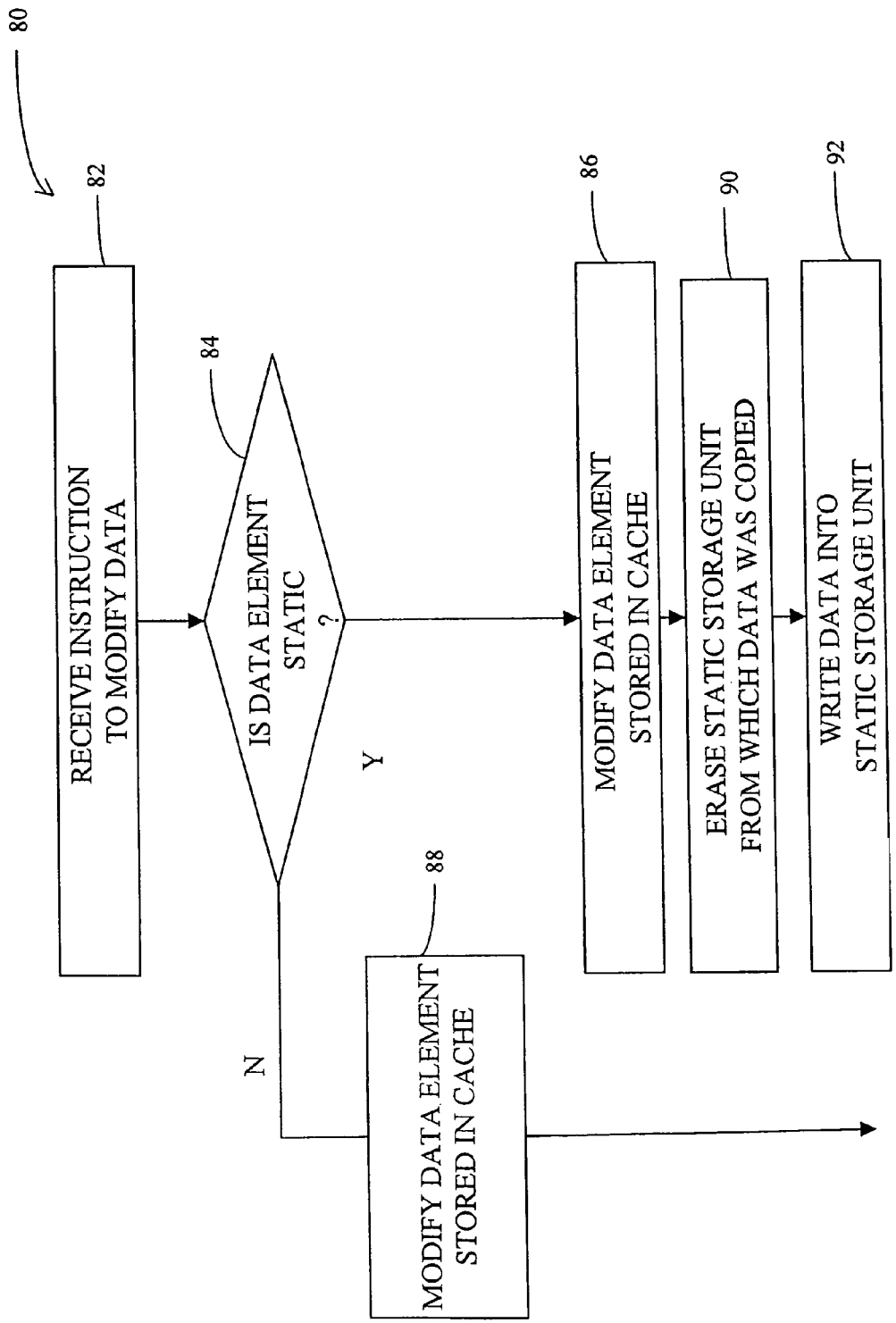

Referring now to FIGS. 2 and 8, the flash memory 32 is arranged in a set of units with each unit capable of holding a fixed amount of data referred to as a page. As is conventional for flash memory, a page of data elements is the smallest amount of data that may be stored in each unit of flash memory at any given time. When modifying the data stored in a unit of flash memory, the unit of flash memory must first be erased before the new data can be stored. Thus, an entire page of flash memory must be erased and written when modifying only a single data element within the page. To avoid having to rewrite an entire page of data into the flash memory 32 each time a single static data element is modified, the present invention provides a method for efficiently modifying the flash memory 32 using the cache memory 39 that may be implemented using software that comprises a subsystem of the database manager 36.

The method 80 begins when a user operating the database interface program 44 attempts to modify a static data element (step 82) contained in the database 38. Of course, the method 80 may instead begin in other manners, for example in response to an application 34 attempting to modify data contained in the database 38. Regardless of the particular starting step, the database manager 36 subsequently accesses a directory stored in the RAM 30 that contains information indicating whether the data element being modified belongs to a static field or a dynamic field (step 84). If the data element being modified is static, then the data element is modified as it appears in the cache 35 (step 86) and the static table file 38A field is overwritten (steps 90, 91). The file system 37 is used to make updates to static table data; consequently, it will load the flash cache 39 with the appropriate flash page containing the field to be updated. The new field value will be written into the flash cache and the cache will be flushed when finished. If instead the data element is a dynamic field, then the database manager 36 modifies the data element in the cache 35 in a manner specified by the user (step 88) and the contiguous memory field in 38C or 38D is updated without using the file system.

For illustrative purposes, the method 80 for modifying the static data elements is described as being performed at the request of a user operating the database interface program. However, as described above, any of the software applications 34 stored in the application node 18 may be adapted to modify the static element data. Moreover, more than one of the applications 34, and/or the user may be attempting to modify static data elements at the same time. In one embodiment, the cache 35 is located in a portion of the RAM 30 that comprises a shared memory space, i.e., a memory space accessible to multiple applications. Further, the database manager 36 causes all of the applications to access the same cache 35 when editing the database 38 so that each application 34 need not create a separate cache and memory space is conserved.

Figure 9:
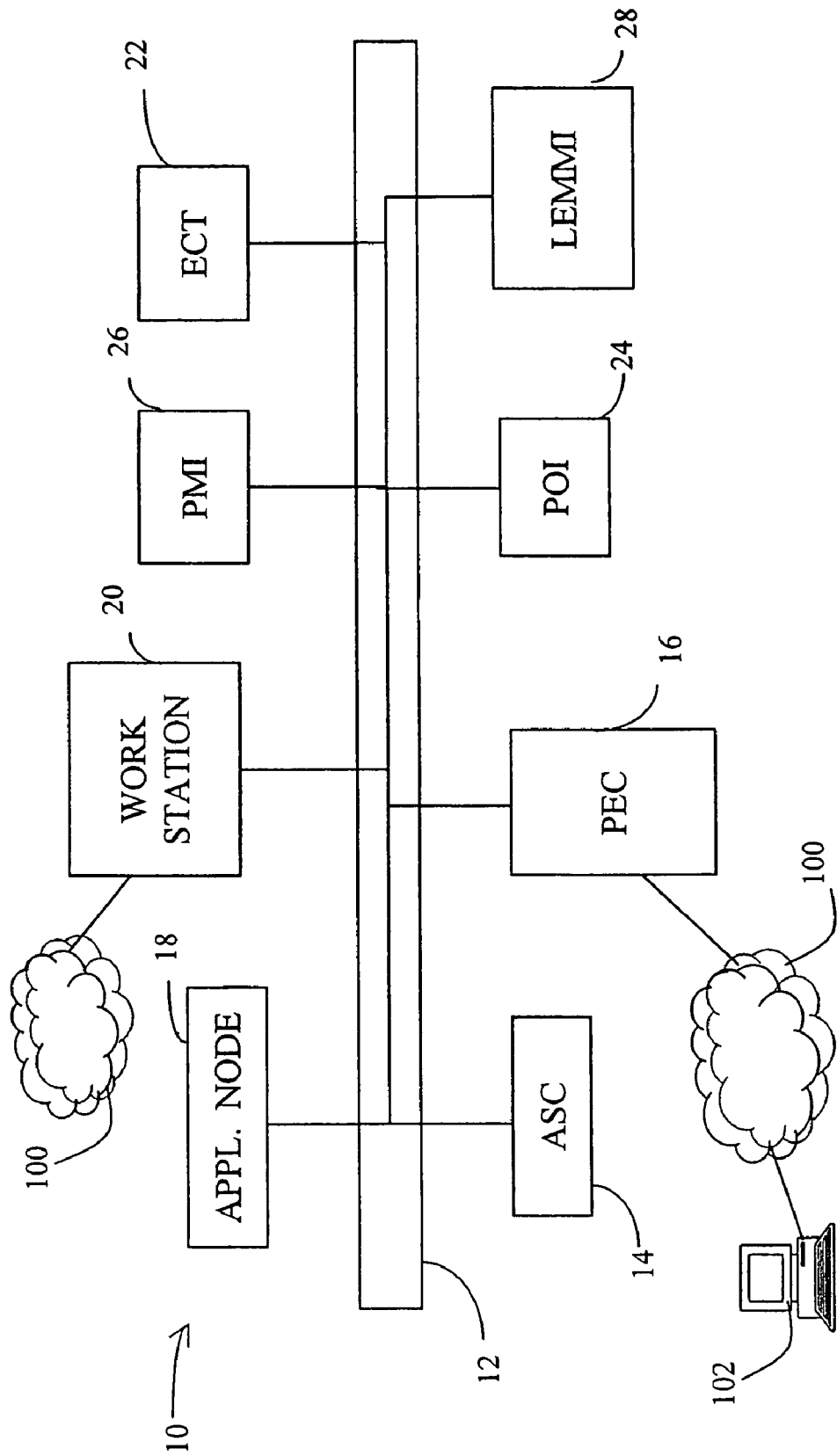
FIG. 9 is a schematic of a control system similar in most respects to that illustrated by FIG. 1, except that an external communications network is further present.

In still additional embodiments of the present invention, the invention may further comprise connection to an external communications network for inputting and outputting data. The schematic of FIG. 9 is useful in describing such an embodiment. It will be appreciated that the schematic of FIG. 9 is consistent in most respects with that discussed above in reference to FIG. 1. FIG. 9 further illustrates, however, an external communications network 100 connected to the workstation 20 and to the programmable controller 16. Through connection to the external network 100, data may be input or output to control the controller system 10 from a remote site such as computer 102. It will be appreciated that a wide variety of communications networks 100 may be comprised within practice of the invention, with preferred examples comprising the internet, world wide web, telephone network, proprietary data networks, satellite based networks, and the like. Further, embodiments of the control system of the invention preferably support Internet protocol communications for widespread interoperability with external communications networks such as the Internet.

It will also be appreciated that through the external network 100 a variety of devices may be interfaced with the control system 10, with the computer 102 shown only for illustration. Through any of these devices, remote control of the control system 10, including but not limited to remote communication with the database 38, database manger 36, and software applications 34, may be achieved. Also, a connection to the external network has been illustrated through work station 20 and through programmable controller 16 for illustration only, those knowledgeable in the art will appreciate that connection may occur at any practical point on the communications network 12, with examples comprising the devices shown as connected thereto. Further, through an external communications network 100, any of the various components 14-28 may be remotely located.

From the foregoing description, it should be understood that a database manager and a database for a control system have been described, having many desirable attributes and advantages. In particular, the database is configured as a set of files that are stored in different memory devices. Specifically, the database includes a file containing static data that is stored in a static memory device and a file containing dynamic data that is stored in a dynamic memory device. As a result, the overall amount of data stored in dynamic memory is reduced and, thus, dynamic memory is conserved. The database manager uses a file system to open the database files and access the data stored therein. Because the database is configured as a set of files, an application located at a remote network device may access the database using the well-known file transfer protocol. In addition, a plurality of applications have access to a cache used to temporarily store static data that is being modified thereby eliminating the need to create a separate cache for each application and reducing fragmentation of the dynamic memory. Further, Boolean elements stored in the database are collected and stored in a group thereby conserving additional memory.

While various embodiments of the present invention have been shown and described, it should be understood that other modifications, substitutions and alternatives are apparent to one of ordinary skill in the art. For example, as described herein, the database and database manager are disposed in the application node. However, the database and database manager may instead be disposed in any of the network control devices provided that the control device includes a processor, static memory device and a dynamic memory device. Further, although described in the context of a building control system, the database and database manager may be implemented in any type of system requiring a data storage system.

Various features of the invention are set forth in the appended claims.

The invention claimed is:

1. A computer program product comprising a non-transitory computer readable code stored on a computer readable medium, that when executed, causes a computer to:
   read a catalog to determine where a set of static data shall be stored in a static memory device;
   store said static data in said static memory device according to said catalog;
   read said catalog to determine where a set of dynamic data shall be stored in a dynamic memory device;
   store said dynamic data in said dynamic memory device according to said catalog;
   enable editing of said static data by temporarily copying a content of a storage unit of said static memory device to said dynamic memory device, wherein said content comprises a data element to be edited;
   maintain a directory indicating that the static data element has been copied to dynamic memory;
   edit said data element while said data element is stored in dynamic memory;
   erase said storage unit of said static memory device; and,
   copy said content, including said data element that has been edited, from said dynamic memory to said storage unit of said static memory.

2. The computer program product of claim 1, said computer program product further causing said computer to: store said static data as a static data file in said static memory device; and store said dynamic data as a dynamic data file in said dynamic memory device.

3. The computer program product of claim 1, said computer program product further causing said computer to:
   access said static data contained in said database cache using a memory pointer; and
   access said dynamic data contained in said dynamic data file using said memory pointer.

4. The computer program product of claim 1 wherein said computer readable code further causes said computer to:
   determine whether the data element to be edited is static data, and if the data element to be edited is static data, then enable editing of said static data.

5. The computer program product of claim 1 wherein said computer readable code further causes said computer to:
   communicate over an external communications network connected to the computer wherein the computer program product is configured to be interfaced with remotely over said external communications network.

6. The computer program product of claim 1, wherein said computer readable code further causes said computer to store said static data in said static memory device according to said catalog, said static data including information pertaining to a process control device.

7. The computer program product of claim 1, wherein said computer readable code further causes said computer to store said static data in said static memory device according to said catalog, said static memory device comprising a flash memory.

8. A method, comprising:
   electronically reading a catalog to determine where a set of static data shall be stored in a static memory device;
   storing said static data in said static memory device according to said catalog;
   electronically reading said catalog to determine where a set of dynamic data shall be stored in a dynamic memory device;
   storing said dynamic data in said dynamic memory device according to said catalog;
   temporarily copying a content of a storage unit of said static memory device to said dynamic memory device, wherein said content comprises a data element to be edited;
   maintain a directory indicating that the static data element has been copied to dynamic memory;
   editing said data element while said data element is stored in dynamic memory;
   erasing said storage unit of said static memory device; and,
   copying said content including said data element that has been edited from said dynamic memory to said storage unit of said static memory.

9. The method of claim 8, further comprising:
   storing said static data as a static data file in said static memory device; and
   storing said dynamic data as a dynamic data file in said dynamic memory device.

10. The method of claim 8, further comprising:
    accessing said static data contained in said database cache using a memory pointer; and
    accessing said dynamic data contained in said dynamic data file using said memory pointer.

11. The method of claim 8, further comprising:
    communicating over an external communications network connected to the computer wherein the computer program product is configured to be interfaced with remotely over said external communications network.

12. The method of claim 8, wherein said static data includes information pertaining to a process control device.

13. The method of claim 8, wherein storing said static data in said static memory device according to said catalog further comprises storing said static data in a flash memory.

14. The method of claim 8, further comprising:

providing a database that includes the set of static data and the set of dynamic data;

storing at least one dynamic data file in a contiguous portion of the dynamic memory device;

receiving a data input file, said data input file defining a first set of data fields to be included in said database and said data input file including a set of data elements to be included in said database, the set of data elements including data relating to at least one process control device;

identifying a second set of data fields in said data input file that are designated to contain a Boolean element, said second set of data fields being a subset of said first set of data fields;

defining one or more new data fields for collectively storing said Boolean elements;

modifying said first set of data fields to eliminate said second set of data fields; and generating a catalog that defines an arrangement of said first set of data fields, wherein said arrangement includes said one or more new data fields for collectively storing said Boolean elements.

* * * * *